United States Patent Office 3,098,268
Patented July 23, 1963

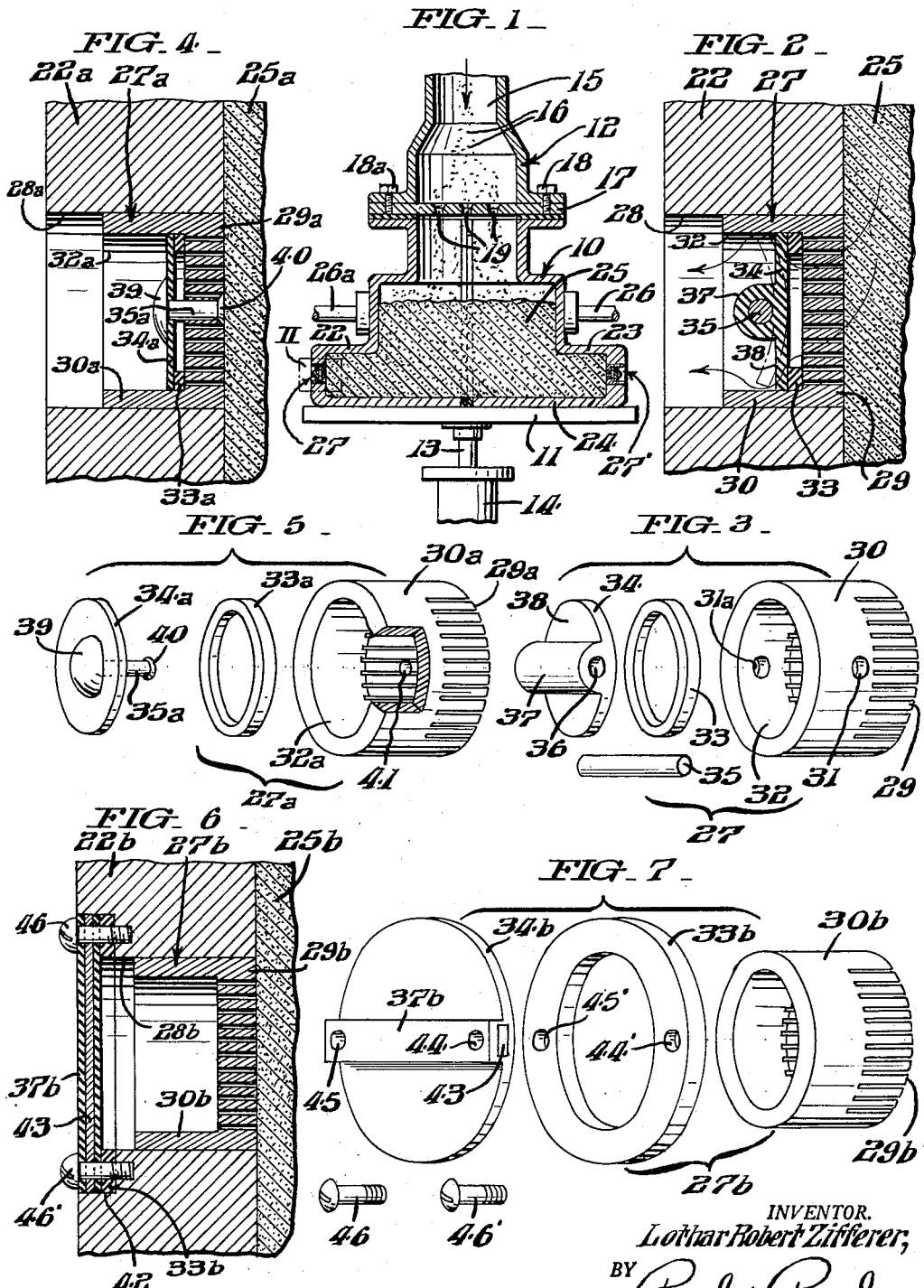

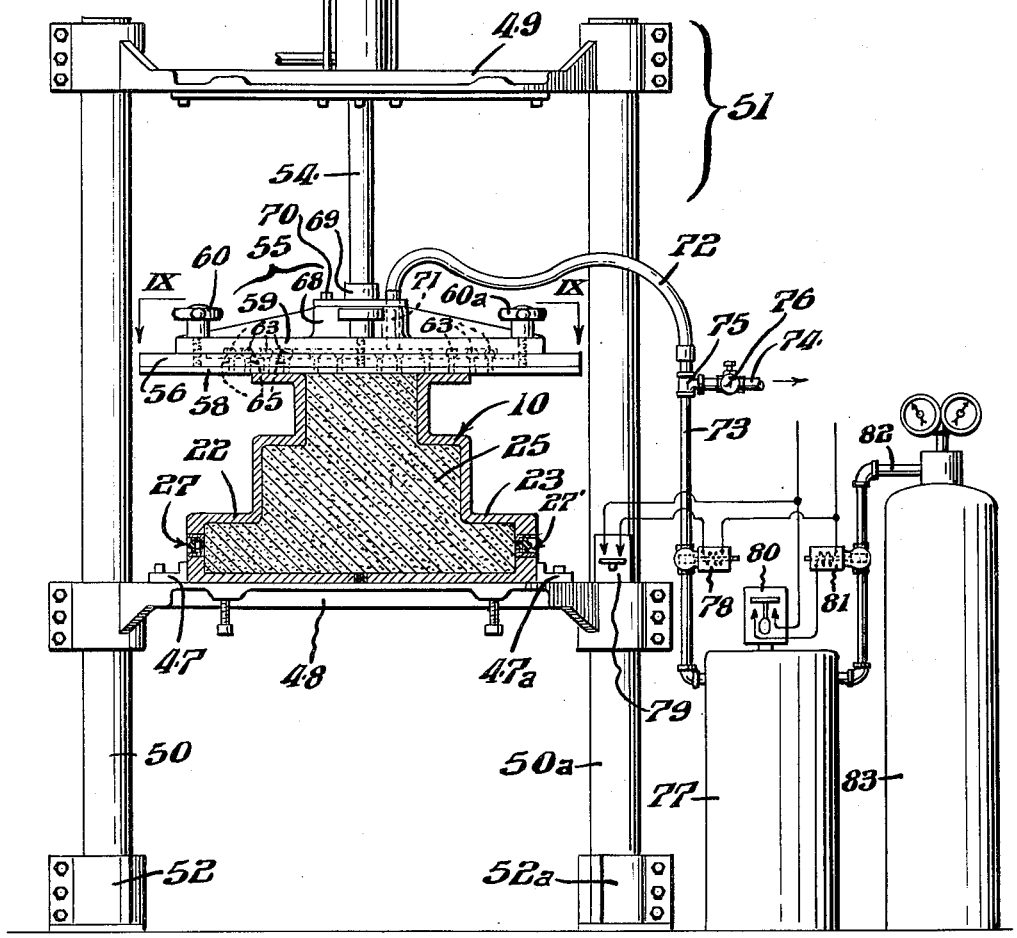

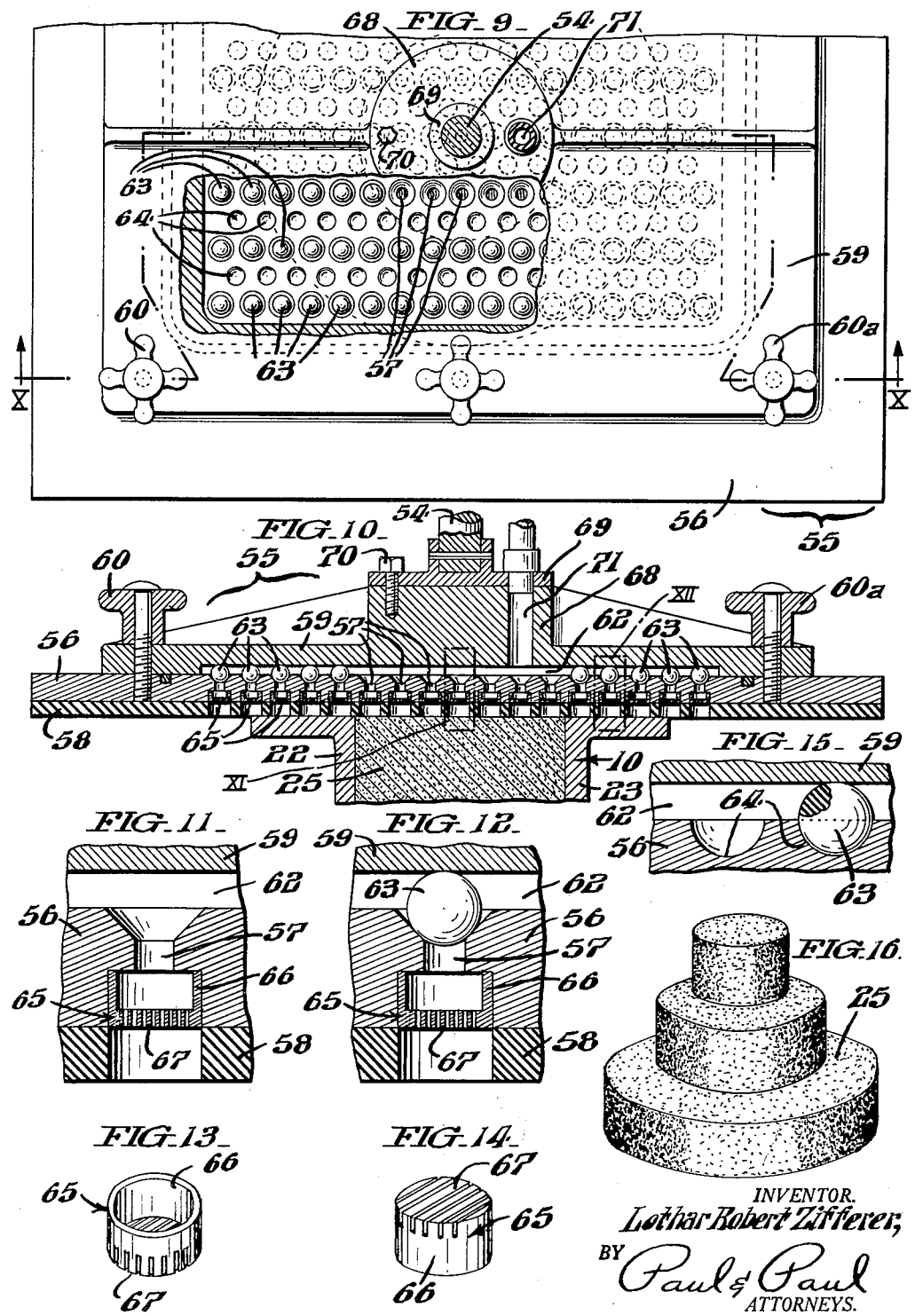

3,098,268
APPARATUS FOR VACUUM GASSING
SAND FORMS
Lothar R. Zifferer, R.D. 3, Glen Rock, Pa.
Filed Feb. 6, 1959, Ser. No. 791,689
14 Claims. (Cl. 22—10)

This invention relates to an apparatus and method for curing or setting a molded granular object. More particularly this invention relates to apparatus especially constructed for the curing of rather large molded granular materials such as molds, cores, or the like, used in foundry operations and herein collectively referred to as sand forms. This invention relates also to a method of curing sand forms of the foregoing character by application of vacuum and reactant gas, wherein the pressure of said reactant gas is maintained below atmospheric pressure and wherein particular forms of apparatus are provided for carrying the aforesaid method into effect.

Conventionally certain sand molds, cores, and the like, are formed or "blown" by forcing an air, sand and waterglass (sodium silicate) mixture by machine into a core box constructed to shape the particular mold or core desired and subsequently "cured" by the application under pressure of a reactant gas, such as carbon dioxide, for example, into the resulting molded product. The reactant gas reacts chemically with the water-glass, producing a silica gel which securely holds the granular particles together. It is known that a sand form may be more satisfactorily and permanently cured if it is first evacuated of air before the application of the reagent gas under pressure. A curing process which includes the evacuation of air from a sand form and the subsequent introduction under pressure of reagent gas into the sand form is known conventionally in the art as "vacuum gassing" a sand form.

Particularly advantageous results are obtained in the curing of said forms by vacuum gassing when the evacuation and pressurization of the form are repeated through several cycles. In my U.S. Patent No. 2,824,345, issued February 25, 1958, the specification of which is hereby incorporated hereinto by reference, I have disclosed an improved apparatus and method for the multi-cyclic vacuum gassing of a sand form wherein the sand form is deposited in a chamber, a relatively high vacuum is drawn upon the chamber, carbon dioxide is introduced into the chamber under pressure and the vacuum and carbon dioxide steps are repeated; and in my co-pending application Serial No. 651,929, filed April 10, 1957, the specification of which is also hereby incorporated hereinto by reference, I have further disclosed that particularly advantageous results are obtained by applying a vacuum to the sand form, then admitting carbon dioxide but limiting the extent of such admission to the point that the maximum carbon dioxide pressure is less than atmospheric pressure, then repeating the evacuation and again repeating the carbon dioxide introduction, again limiting the carbon dioxide pressure to a value below atmospheric pressure.

While the method of vacuum gassing a sand form, and especially the foregoing methods of multi-cyclic vacuum gassing, result not only in a faster cure but in a much more complete one as well, it has required the construction of a vacuum chamber type of "gasser," the cost of which has represented an appreciably greater investment over that required to be made in conventional pressure gassing apparatus whereby the sand form is subjected to the application of a gaseous reagent under pressure without first evacuating air from the form. Moreover, the utilization of the vacuum chamber in vacuum gassing tends to slow the speed of the cycle when alternately drawing vacuum and applying reagent gas under pressure in the multi-cyclic process of curing a sand form.

I have now discovered that the gassing head of a conventional pressure gassing apparatus can be adapted to the vacuum gassing method of curing "blown" cores or forms when used with specially constructed core boxes provided with a novel vent means which permits the escape of air from the core box when "blowing" the core, but which does not allow re-entry of air into the core box upon evacuation.

Accordingly, it is an object of this invention to provide an apparatus and method for curing a sand form by vacuum gassing whereby the need for utilization of a vacuum chamber is entirely eliminated, thereby reducing the total cost of vacuum gassing apparatus.

It is another object of this invention to provide an apparatus and method for curing a sand form whereby in either uni-cyclic or multi-cyclic curing, the time required to complete the cycles of alternately drawing vacuum and applying reagent gas under pressure is appreciably lessened.

It is another object of this invention to provide an apparatus for curing a chemically hardenable sand form whereby the general introduction of reagent gases into the sand form as well as the removal of said reagent gases by neutralization or flushing with air is greatly improved and facilitated.

It is another object of this invention to provide an apparatus for curing a chemically hardenable sand form whereby a greater economy in the amount of reagent gas used in the curing process is achieved than heretofore in the use of the vacuum gassing process.

Other objects and attendant advantages will further become apparent in the following description of a specific embodiment of the invention, and in the drawings wherein:

FIG. 1 is a cross-sectional view of a core box constructed in accordance with this invention clamped into position beneath the head of a conventional "core blowing" apparatus.

FIG. 2 is a magnified view of the area II of FIG. 1, showing the construction of a vent of the core box in greater detail.

FIG. 3 is a view in perspective of the component parts of the core box vent check illustrated in FIG. 2.

FIG. 4 is a view in cross-section of a modification of the core box vent illustrated in FIG. 2.

FIG. 5 is a view in perspective of the component parts of the core box vent check illustrated in FIG. 4

FIG. 6 is a view is cross-section of another modification of the core box vent illustrated in FIG. 2.

FIG. 7 is a view in perspective of the component parts of the core box vent check illustrated in FIG. 6.

FIG. 8 is a view partly in cross-section and partly in perspective showing a core box positioned beneath the gassing head of a vacuum gassing apparatus as constructed according to this invention.

FIG. 9 is a view in plan, partly broken away, of the gassing head assembly as indicated by the lines and arrows IX—IX of FIG. 8.

FIG. 10 is a staggered cross-sectional view of the gassing head assembly as indicated by the lines and arrows X—X of FIGURE 9.

FIG. 11 is a magnified view in section of the orifice and vent check of the gassing head enclosed within the area indicated by the broken lines XI of FIGURE 10.

FIG. 12 is a magnified view in cross-section of the orifice and vent check of the gassing head enclosed within the area indicated by the broken lines XII of FIGURE 10.

FIG. 13 is a view in perspective partially showing the interior of a standard vent check of a gassing head as constructed in accordance with this invention.

FIG. 14 is a view in perspective of the exterior of a standard vent check of a gassing head as constructed in accordance with this invention.

FIG. 15 is a view, partly in cross-section, of two of the concave storage depressions of the gassing head as constructed in accordance with this invention and showing, partly in perspective, a rubber ball stored in one concave depression.

FIG. 16 is a view in perspective of a sand form as cured in accordance with this invention.

The following description is directed to the specific forms of the apparatus and method as shown in the drawings and is not intended to be addressed to the scope of the invention as exemplified by the drawings. It will be appreciated that the drawings represent preferred embodiments of the invention which is capable of being practiced in a wide variety of forms and arrangements.

Adverting herewith to the specific form of the invention illustrated in the drawings, a core box 10 supported by a vertically adjustable plate 11 is clamped in place beneath the head 12 of a conventional "core blowing" apparatus, as seen in FIG. 1. Affixed to the underside of the plate 11 is a vertically moveable rod 13 extending upward from an air cylinder 14. The head 12 is comprised of a sand reservoir 15 to which is fed a granular sand mixture 16 from a sand hopper, not shown, and a blow plate 17 secured to the sand reservoir 15 by screws 18 and 18a. In the blow plate 17 are provided the orifices 19 through which the sand mixture 16 is "blown," together with air, into the core box 10. The core box walls 22 and 23 and bottom 24 are of sufficiently hermetic construction to permit a substantial vacuum to be drawn upon the core 25. The two halves of the core box 10 are pressed tightly together by clamps 26 and 26a sufficiently to form an effective air seal. Located within an opening in each of the walls 22 and 23 of core box 10 are vent checks 27 and 27′, respectively. The positioning of the vent checks in the aforesaid openings is best illustrated in FIG. 2 which shows the vent check 27 seated in a circular opening 28 extending through the core box wall 22 so that the slotted head 29 of the vent check is fixed flush with the inside surface of the wall. The vent check 27 is fitted within the opening 28 so that a substantially air-tight seal is formed between the wall 30 of the vent check and the wall 22 of the core box. As seen in FIG. 3, the cylindrical wall 30 of cup-shaped vent check 27 is provided with opposing circular openings 31 and 31a between the head of the vent check and the open end 32. Adjacent the inner surface of the vent check head 29 is an annular rubber seat 33 against which a rubber flapper 34 is tightly held by a pin 35 which passes through the openings 31 and 31a in the wall 30 and through an opening 36 provided in an elongated ridge 37 formed on the outside surface 38 of the flapper 34.

A modification of the core box vent check as provided in accordance with this invention is illustrated in FIGS. 4 and 5. Vent check 27a is positioned within circular opening 28a in wall 22a so that the head 29a of the vent check is flush with the inner surface of the core box wall, and so that a substantially air-tight seal is formed between the wall 30a of the vent check and the wall 22a of the core box. A rubber flapper 34a seats against a rubber washer 33a adjacent the vent check head 29a and is held tightly in position by a pin 35a having a head 39 molded into the flapper and an up-set 40 which fits securely into a circular depression 41 provided for that purpose in the center of the inner surface of the head 29a.

In another modification of the core box vent check as provided in accordance with this invention and illustrated in FIGS. 6 and 7, although the head 29b and wall 30b of the vent check are positioned in the core box wall as before, the annular seat 33b for the flapper 34b is positioned in a circular depression 42 formed in the outer surface of the core box wall 22b. A molded ridge 37b is provided across the outer surface of the rubber flapper 34b through which extends the metal insert 43. Openings 44 and 45 are provided through the molded ridge and metal insert of flapper 34b, and corresponding openings 44′ and 45′ in annular seat 33b, for the insertion of screws 46 and 46′ which hold both the annular seat 33b and the flapper 34b firmly within the depression 42 of the core box wall 22b.

In FIG. 8 the core box 10 containing a "blown" core 25 to be cured, is shown supported between clamps 47 and 47a upon a platform forming a part of stationary cross-piece 48 which cooperates with another cross-piece 49 to brace the vertical uprights 50 and 50a of the frame 51. Uprights 50 and 50a are securely supported at the base by the bolted floor clamps 52 and 52a. Supported upon the cross-piece 49 is a vertically arranged cylinder 53 having a reciprocating piston member 54 to the distal end of which is attached a gassing head assembly 55, likewise capable of reciprocating up and down in a line coextensive with the path of reciprocating of piston member 54. As best seen in FIG. 10, the gassing head assembly 55 comprises a rectangular bottom plate 56, in which are formed orifices 57 and to the under surface of which is secured a layer of gum rubber 58, through which the orifices 57 extend; and a cover plate 59, also rectangular in shape but of smaller area than the bottom plate 56, to which it is secured by knobbed screws 60 and 60a. Cover plate 59 is provided with an indented area in its undersurface forming a space 62 which encompasses the orifices 57 of bottom plate 56. Situated within the space 62 are rubber balls 63 which seat either within the inverse frusto-conical entrance to each orifice or in concave storage depressions 64 provided alternately between rows of the orifices 57, as shown in FIG. 9. Within the lowest and widest portion of each of the orifices 57 is positioned a standard vent check 65, of cup-like shape, having a cylindrical wall 66 and slotted head 67. The vent check 65 is fixed within each orifice so that a substantially air-tight seal is made between the wall 66 of the vent check and the wall of the orifice, and so that the head 67 of the vent check is flush with the under surface of bottom plate 56.

Forming a molded part of the top of cover plate 59 is a turret 68 to which the reciprocating piston member 54 is secured by means of a fitting 69 and screw 70. Formed within the turret 68 for the passage of gases into or out of the gassing head is a bore 71 which communicates with the space 62. Leading into the bore 71 through fitting 69 at the top of turret 68 is a pressure hose 72 connected at its other end to metal piping 73. Another pipe 74 leading from a vacuum pump, not shown, communicates with pipe 73 at the joint 75 through valve 76 for the drawing of vacuum upon the gassing head. Metal piping 73 further leads to a reagent gas reservoir 77 through a solenoid valve 78 which is opened and closed by the electrical switch 79. Positioned at the top of the gas reservoir 77 is a high-sensitivity (large diaphragm) pressure regulator 80 for maintaining the pressure of gas in the reservoir 77 at a pressure just under 760 mm. of mercury. Pressure regulator 80 is in electrical communication with switch 79 and with a solenoid valve 81 positioned in metal piping 82 communicating between gas reservoir 77 and a tank 83 containing gaseous reagent under high pressure.

In the usual practice of this invention, the core box 10, provided with check vents 27 and 27′, is placed upon the adjustable plate 11 between clamps 26 and 26a preparatory to "blowing" the core 25. Plate 11 is adjusted to bring the top of the core box 10 into flush contact with the blow plate 17 of head 12 of the "core blowing" apparatus. The air cylinder 14 forces the vertically reciprocating rod 13 upward with sufficient pressure to effect a substantially air-tight seal between the top of the core box and the blow plate 17. The core 25 is then "blown" by forcing air and a chemically hardenable sand mix from the reservoir 15 through orifices 19 of blow plate 17. The air forced into the core box is allowed to escape through check vents 27 and 27′. After passing through the slots of the vent check head 29, the air, by reason of the pressure with which it is applied to the core box, pushes the rubber flapper 34 away from its annular seat 33 and escapes from the core box through opening 28, as indicated in FIG. 2. The sand mixture 16, however, is unable to pass through the slotted head 29 of the vent check and is consequently retained in the box. The core box space is, therefore, completely filled with the sand mixture during the "blowing" operation which requires only a fraction of a second.

After the core 25 has been formed in the foregoing manner, the core box 10 is placed, preparatory to the curing operation, between clamps 47 and 47a on the platform of cross-piece 48 of the gassing apparatus. The gassing head 55 is then opened by unscrewing the knobbed screws 60 and 60a, which secure the cover plate 59 to the bottom plate 56, and rubber sealing balls 63, stored within the head 55 in concave depressions 64 of bottom plate 56, are positioned to seal off all of the orifices 57 which lie outside the opening of the top of core box 10. Such transference of the sealing balls may be made with a long handled tool provided for that purpose without ever removing the aforesaid balls from the gassing head. Excess rubber balls not needed for sealing off orifices beyond the ambit of the core box opening are left stored in the concave depressions 64.

When the orifices 57 of the gassing head 55 have been thus prepared to fit the opening in the top of the core box, the cover plate 59 is screwed tightly to bottom plate 56 and the gassing head 55 is lowered by means of piston member 54 to contact the top of the core box. The cylinder 53 supplies sufficient pressure to effect an air-tight seal between the top of the core box and gum rubber layer 58 on the under-surface of bottom plate 56. After the positioning of the gassing head in the manner described, valve 76 is opened and a vacuum is drawn on the core box. Although air is drawn from the core box through orifices 57 of the gassing head 55, the sand is retained in the box and prevented from being drawn up into the gassing head by the slotted checks 65 positioned in each orifice. Check vents 27 and 27' prevent the entry of air into the box owing to the sealing effect of the rubber flapper 34 against its annular seat 33. As the vacuum is drawn upon the box, the force of atmospheric pressure presses rubber flapper 34 ever more tightly against the annular seat 33, thereby ensuring an effective seal.

Upon evacuation of the core box and core, the valve 76 is closed and the switch 79 is tripped to open valve 78, thereby breaking the vacuum by admitting gaseous reagent from gas reservoir 77 into the evacuated system. As the gas flows from the gas reservoir 77 into the gassing head 55 and thence into core box 10 and core 25, the gas pressure in the reservoir is lowered proportionately, whereupon pressure regulator 80 closes contact and opens the solenoid valve 81 to admit gaseous reagent into gas reservoir 77 from the high pressure gas source 83. When the pressure of reagent gas in reservoir 77 has again reached a value which is preferably just under 760 mm. of mercury, the pressure regulator 80 will close the solenoid valve 81.

Since the pressure of the reagent gas admitted into the core box after evacuation will be less than atmospheric pressure, pressure on the outer surface of flapper 34 of vent check 27 will be greater than the pressure of the reagent gas, whereby the flapper 34 will be maintained in its normal position against annular seat 33 to prevent leakage of reagent gas from the core box. Upon completion of the evacuation and pressurization cycle selected, air is admitted into the system to break the partial vacuum from the final pressurization.

It will be evident that the vacuum gassing apparatus as herein described is adaptable to either a uni-cyclic or multi-cyclic method of curing a sand form. Moreover, the apparatus and method of this invention are not limited to any particular gaseous reagent, but may be used with a variety of such reagents. In a typical example of the uni-cyclic method of curing a sand form in accordance with this invention, a core box equipped with a check vent as hereinbefore described, is placed under the head of a "core blower" and a "core" of chemically hardenable sand mix is "blown" into the aforesaid box. The air by which the sand mix is "blown" into the core box excapes from the check vent while the sand mix itself is retained therein. Upon completion of the blowing operation, the core box containing the "blown" core is placed beneath the gassing head of the vacuum gassing apparatus as hereinbefore described and a partial vacuum is drawn upon the box. Thereafter, the core box and core are then pressurized with a reagent gas, such as carbon dioxide, so that the absolute pressure within the box is less than one atmosphere. Finally air is admitted into the core box whereby the partial vacuum resulting from the final pressurization is broken.

An important instance of the application of the apparatus and method of this invention to the curing of a sand form is in the multi-cyclic vacuum gassing of the form using carbon dioxide as the gaseous reagent. For example, a core box constructed according to this invention and containing a "blown" core is placed beneath the head of the vacuum gassing apparatus as constructed according to this invention, and evacuated to more than 28 inches of mercury. The core box and core are then pressurized with carbon dioxide so that absolute pressure of the gas within the box is greater than one-tenth atmosphere but less than one atmosphere. The core box is again evacuated to more than 28 inches of mercury, after which it is again subjected to carbon dioxide under pressure of at least one-tenth atmosphere but less than one atmosphere. Upon the termination of the foregoing cycles, air is admitted into the system to break the partial vacuum resulting from the final pressurization.

Illustrative of another important application of the apparatus and method of this invention is multi-cyclic vacuum gassing of a sand form using gaseous hydrogen chloride as reagent: A core box constructed according to this invention and containing a "blown" core is evacuated to more than 28 inches of mercury. The core box and core are then pressurized with hydrogen chloride gas so that the absolute pressure of the gas within the core box is greater than one-tenth atmosphere, but less than one atmosphere. Gaseous ammonia is then introduced into the core box to neutralize the hydrogen chloride and arrest the reaction in order to procure a controlled cure. A sub-atmospheric pressure of ammonia is thereby created within the core box. Thereafter the core box is again evacuated to more than 28 inches of mercury and air is introduced into the box to a partial pressure just below atmospheric pressure. The final steps of evacuation and partial pressurization with air are usually repeated, except when curing a "shallow" core.

It will be clear that although in the preferred embodiment of this invention, a pneumatic cylinder has been selected as actuating means for producing the relative movement of gassing head and core box whereby sealing contact is made therebetween, the invention is by no means limited to any particular form of actuating means for this purpose, but, on the contrary, comprises a wide variety of forms and arrangements whereby such relative movement may be accomplished.

It will be apparent that a very important advantage of this invention lies in the elimination of the vacuum chamber in the vacuum gassing of sand forms, thereby reducing not only the cost of the total apparatus, but also eliminating a number of operational obstacles. Specifically, the combination of gassing head and core box equipped with check vents greatly enhances operational efficiency by permitting the general introduction and removal of gaseous reagents by neutralization and affords great facility for flushing with air.

Since only a relatively small volume of reagent gas is required to fill the granular interstices of a core, another important advantage is realized in the reduced amount of reagent gas needed to be used in the curing of a sand form according to this invention as compared with the amount of such reagent required with the use of vacuum chamber apparatus. Moreover, the introduction of the reagent gas directly into a core box, of relatively small volume, has eliminated the need for the high forcing pressures required for introduction of the gas into a vacuum chamber. The elimination of high forcing pressures and relatively large volumes of gases not only contribute to the reduced cost of the curing operation but greatly enhance its efficiency as well by reducing the danger of leakage of poisonous gases into the atmosphere.

Although this invention has been disclosed with reference to specific forms and embodiments thereof, it will be evident that a great number of variations may be made without departing from the spirit and the scope of this invention. For example, parts may be reversed, equivalent elements may be substituted for those specifically disclosed, and certain features of the invention may be used independently of other features, all without departing from the spirit and scope of this invention as defined in the appended claims.

Having thus described my invention, I claim:

1. In a check vent for a core box adapted for use in curing a sand form the combination which comprises a rigid metal cylinder disposed in an aperture in a wall of said core box and arranged in sealing contact therewith, said cylinder having a transverse barrier provided with a plurality of substantially parallel slotted openings which extend therethrough, said openings being sized to obstruct the passage of sand while permitting the passage of gas therethrough and a flexible disk seated in said aperture adjacent said cylinder and extending across the bore thereof, said disk having a surface arranged for sealing contact at the periphery of said aperture to seal said aperture against the entry of gas into said core box whenever the pressure of gas therewithin is less than atmospheric pressure and to open said aperture to allow the passage of gas out of said core box whenever the pressure of gas therewithin is greater than atmospheric pressure, said disk having a ridge molded upon a surface thereof, a fastener receptacle disposed adjacent said disk and an elongated metal fastener lodged in said ridge of said disk, said fastener extending through at least a part of said disk into said fastener receptacle and retentively engaged therein.

2. A vent check for a core box having a cylindrical aperture in a wall thereof comprising a hollow cylinder disposed in said aperture and arranged in sealing contact with the wall thereof, said cylinder having a transverse barrier provided with a plurality of openings which extend therethrough, said openings being sized to prevent the passage of sand while permitting the passage of air therethrough, said cylinder having opposing openings on each side thereof, a flexible disc arranged within said cylinder adjacent said transverse barrier and extending across the bore of said cylinder, said disc having a surface arranged for sealing contact with said barrier when a vacuum is drawn upon said core box, said disc having a ridge molded upon a surface thereof, said ridge having an opening therethrough arranged in alignment with said openings in said cylinder, said aligned openings having a pin extending therethrough for maintaining said disc in positon across the bore of said cylinder.

3. A vent check for a core box having a cylindrical aperture in a wall thereof comprising a hollow cylinder disposed in said aperture and arranged in sealing contact with the wall thereof, said cylinder having a transverse barrier provided with a plurality of openings which extend therethrough, said openings being sized to prevent the passage of sand while permitting the passage of air therethrough, said barrier having a circular depression formed in its center, a flexible disc arranged within said cylinder adjacent said transverse barrier and extending across the bore of said cylinder, said disc having a surface arranged for sealing contact with said barrier when a vacuum is drawn upon said core box, said disc having a pin extending through the center thereof, said pin having a head at one end thereof molded within said disc and having a ridged head at its opposite end, said ridge being wedged in said depression in said barrier whereby said flexible disc is maintained in position across the bore of said cylinder.

4. A vent check for a core box having a cylindrical aperture in a wall thereof comprising a hollow cylinder disposed in said aperture adjacent the inner surface of said wall, and arranged in sealing contact with the wall of said aperture, said cylinder having a transverse barrier provided with a plurality of openings which extend therethrough, said openings being sized to prevent the passage of sand while permitting the passage of air therethrough, an annular seat disposed adjacent the wall of said core box and arranged to encircle said aperture, said annular seat having opposing circular openings formed therein, a flexible disc disposed adjacent said annular seat and arranged for sealing contact therewith when a vacuum is drawn upon said core box, said flexible disc having a ridge molded on a surface thereof, said ridge having a metal insert running therethrough, said disc having openings formed therein at the opposite ends of said ridge, said openings in said disc being arranged in alignment with the openings in said annular seat, and fastening means extending through said aligned openings for maintaining said disc in position across said aperture.

5. In a vacuum gassing apparatus, an improved gassing head comprising in combination a separable member having a bottom plate and a cover plate forming a chamber therebetween, said bottom plate having a plurality of orifices opening into said chamber, barrier means disposed adjacent said orifices for obstructing the passage of sand into said chamber while permitting the passage of air, a plurality of elastic spheres disposed within said chamber adjacent said orifices for sealing off said orifices individually, said spheres being arranged for selective opening and closure of any of said orifices without removal of said spheres from said chamber and means connected to said cover plate for evacuating gas from said chamber and for introducing gas thereinto.

6. In a vacuum gassing apparatus, a movable gassing head adapted for use with a core box comprising in combination a separable member having a bottom plate and a cover plate forming a chamber therebetween, said bottom plate having a plurality of orifices extending therethrough and opening into said chamber, a flexible sealing pad disposed on the outer surface of said bottom plate and arranged to make sealing contact with the top of the core box, barrier means disposed adjacent said orifices for obstructing the passage of sand thereinto while permitting the flow of air therethrough, a plurality of elastic spheres disposed within said chamber adjacent said orifices for sealing off said orifices individually, said spheres being arranged for selective opening and closure of any of said orifices without removal of said spheres from said chamber, means connected to said cover plate for evacuating gas from said chamber and for introducing gas thereinto and actuating means connected with said cover plate and arranged for the vertical movement of said gassing head alternatively into and out of contact with the top of said core box.

7. The gassing head defined in claim 6 wherein said hollow member is provided with concave depressions within said chamber for the storage of said elastic spheres.

8. In a vacuum gassing apparatus, an improved gassing head comprising in combination a separable member having a bottom plate and a cover plate forming a chamber therebetween, said bottom plate having a plurality of orifices opening into said chamber, barrier means disposed adjacent said orifices for obstructing the passage of sand into said chamber while permitting the passage of air, a plurality of elastic spheres disposed within said chamber adjacent said orifices for sealing off said orifices individually, said spheres being arranged for selective opening and closure of any of said orifices without removal of said spheres from said chamber, and means connected to said cover plate for evacuating gas from said chamber and for introducing gas thereinto.

9. The apparatus defined in claim 8 wherein said bottom plate has formed therein concave depressions disposed among said orifices within said chamber, said depressions containing the excess of said spheres not used for sealing.

10. The apparatus defined in claim 8 wherein said actuating means comprises a pneumatic cylinder carried by said frame, said cylinder having a vertically reciprocating piston member connected to said gassing member.

11. An apparatus for curing the sand form comprising in combination a support frame, a gassing member carried by said support frame, said gassing member having a bottom plate and an adjacent cover plate, said plates being constructed to form a chamber within said gassing member, said cover plate having a bore formed therein communicating with said chamber, said bottom plate having a layer of gum rubber adjacent the under surface thereof, said bottom plate having a plurality of orifices therein opening into said chamber, said orifices each having disposed therein a cylindrical barrier element arranged in sealing contact with the wall of its orifice, said barrier element having openings therein sized to prevent the passage of sand therethrough, a core box having substantially hermetic bottom and side walls but having an opening at the top, said core box having vent means in a wall thereof for the escape of gasses therefrom, said vent means comprising a barrier element for retention of sand in said core box and a sealing element for preventing the entry of gas thereinto, a platform affixed to said frame for the support of said core box beneath said gassing member, actuating means connected to cause relative movement of said core box and said gassing member and to bring said bottom plate into and out of contact with the top of said core box, a plurality of elastic spheres disposed within said chamber and arranged to seat within the openings of orifices outside the area of contact of said bottom plate with the top of said core box, a gas reservoir connected to said bore in said cover plate, means for supplying a gas to said reservoir, pressure regulating means connected with said reservoir for maintaining a constant pressure therein, and means connected to said bore in said cover plate for evacuating said core box through said orifices.

12. In a method of making a sand form, the steps which comprise forcing a chemically hardenable sand mix into a core box with air under pressure, retaining said mix in said core box while allowing said air to escape through a vent thereof, removing said core box to a different location and then applying a gassing head to the top thereof, partially evacuating the interior of said core box while allowing the exterior thereof to remain at atmospheric pressure by applying suction to the top of said core box and simultaneously checking the entry of air into said box through said vent, introducing a reagent gas into said core box to an absolute pressure therein of less than one atmosphere, again partially evacuating said core box as before, and again introducing said reagent gas into said core box as before.

13. The method of claim 12 wherein the second mentioned introduction of reagent gas is carried out to an absolute pressure within said core box of less than one atmosphere.

14. The steps defined in claim 12 wherein said reagent gas is carbon dioxide.

References Cited in the file of this patent

UNITED STATES PATENTS

| | | |
|---|---|---|
| 259,682 | Gruber | June 20, 1882 |
| 2,482,321 | Copeland et al. | Sept. 20, 1949 |
| 2,563,643 | Ranek | Aug. 7, 1951 |
| 2,759,229 | Magnuson et al. | Aug. 21, 1956 |
| 2,777,464 | Mosely | Jan. 15, 1957 |
| 2,789,325 | McKee | Apr. 23, 1957 |
| 2,824,345 | Zifferer | Feb. 25, 1958 |
| 2,864,134 | Harrison | Dec. 16, 1958 |
| 2,913,000 | Roberts | Nov. 17, 1959 |
| 3,008,205 | Blaies | Nov. 14, 1961 |

FOREIGN PATENTS

| | | |
|---|---|---|
| 710,099 | Great Britain | Apr. 1, 1952 |